Patented Feb. 23, 1954

2,670,048

UNITED STATES PATENT OFFICE 2,670,048

METHOD OF SEALING POROUS FORMATIONS

Paul L. Menaul, Tulsa, Okla., assignor to Stanolind Oil and Gas Company, Tulsa, Okla., a corporation of Delaware No Drawing. Application October 20, 1949,
Serial No. 122,580

8 Claims. (Cl. 166—22)

This invention relates to a method of plugging permeable rocks. More particularly, this invention is concerned with an improved method for sealing permeable formations penetrated by an oil or gas well or by an injection well in oil or gas formations.

Various methods have been proposed for sealing permeable formations penetrated by a well to shut off water and for other purposes. These proposals may be divided into two general classes. In the first class, a plug is formed in the bore, as, for example, by injecting Portland or gypsum cement or modifications thereof into the bore and allowing it to set. The second method may be described generally as a process wherein the sealing agent is injected into the pores of the formations and there permitted to harden or solidify. The first and most common method of sealing permeable formations has limited practicability in a number of respects inasmuch as the plug, even though substantially non-permeable, cannot prevent migration of the connate formation fluids both vertically and horizontally in the strata adjacent the well. More specifically, the effect of a small diameter plug in a well upon the migration of fluid in a reservoir is substantially negligible. Attempts have been made to overcome this limitation by injecting the plugging material into the formations for substantial distances back from the well. Various resins, gums, and other materials which produce a solid precipitate in a formation have been tried. Little success has been accomplished, however, due generally to a number of factors. In thermosetting resins, for example, those resins which are polymerized or hardened by the action of heat, a substantial time is required in which the liquid resin must be maintained in a substantially quiescent condition. This may run from 1 to 7 or more days. Obviously, under such conditions, a high plugging efficiency cannot be obtained.

It is an object of this invention to provide an improved method of plugging permeable rocks. It is a further object of this invention to provide a method of sealing the pores in the permeable strata penetrated by a well by injecting a liquid resin into such pores and solidifying the resin in place by injecting a miscible coagulating agent into the same pores. A still further and more detailed object of this invention is to provide an improved method of sealing the pores in permeable rocks penetrated by a well by injecting into said permeable rocks an acrylic resin in a fluid state and subsequently precipitating a solid plug in the pores of the rock by injecting into the rock an anionic miscible coagulant for the acrylic resin. Other objects and advantages of this invention will become more apparent as the description thereof proceeds.

This invention, in brief, consists of dissolving or otherwise dispersing an acrylic resin in a hydrocarbon or other suitable solvent and injecting the solution or dispersion into the strata to be plugged. An anionic fluid miscible with the resin solution is then injected into the same strata to coagulate or precipitate the acrylic resin.

The invention, in greater detail, consists of injecting into the porous formations penetrated by a well a dispersion of an acrylic resin in a suitable solvent. The acrylic resin may consist of any of the polymerized acrylic esters or alpha-substituted derivatives thereof, such as the polymethacrylates. The polymers of acrylic esters other than polyacrylates and polymethacrylates, for example, the polyethacrylates, may be used. However, the polymethacrylates are the most readily available, the most economical, and harder than the corresponding polyacrylates and therefore will be employed in the preferred embodiment and referred to herein as representative of the whole class of polymerized acrylate esters. All of the homologues of the polyester series have some application. However, I prefer the range methyl to isobutyl in the methacrylate series, since the higher esters are in many cases difficultly soluble in most of the solvents or dispersants.

I have found that from about 0.5 to about 5 per cent of the polymer may be dispersed in the solvent to produce a suitable plugging agent. In general, lower concentrations are required in the higher polymers; i. e., an iso- or n-butyl methacrylate, for example, produces a more satisfactory plugging agent at lower concentrations than does the methyl methacrylate. I prefer a concentration which will produce a solution having a viscosity between about 5 and about 30 centipoises on the Stormer viscosimeter at low shear rates and room temperature. Generally, less than from about 2 to about 4 per cent of the solid, depending upon the methacrylate ester of the mono or polyhydric alcohol, is required. This polymethacrylate, preferably in the form of commercially available molding powder, is dissolved in any of a number of suitable solvents.

I have found that the polymers of the higher methacrylate esters, such as butyl methacrylate, may be dissolved in gasoline or any of the lighter hydrocarbons at atmospheric temperatures. However, in some cases, particularly in the case of the lower polymers such as methyl methacrylate, a higher temperature assists the dispersion. At 150° F. or higher, these methacrylates may be dispersed, within a few minutes; whereas, at lower temperatures, an hour or more is sometimes required for complete dispersion. I have found also that in some cases it is desirable, first, to disperse the resin in more active solvents than gasoline. The chlorinated hydrocarbons will dissolve or disperse the polymers in much less time. Therefore, in some cases, the polymer may be dispersed in chloroform, ethylene dichloride, or the like, or in other solvents such as acetone, ethyl acetate, toluene, benzine, or the like, and then the dispersion can be diluted with a cheaper hydrocarbon such as gasoline, kerosene, or the like. The acrylic resin, regardless of the method of dispersion, will accomplish the same plugging effect, as shown hereinafter.

This resin dispersion is then injected into a well. Means may be provided, as is well known in the art, for injecting the dispersion into a selected strata. However, in some cases, as, for example, in gas or water injection wells where it is desirable to plug only the most highly permeable rocks, the dispersion may be injected into the well without isolating a particular zone, and very desirable results are obtained. More particularly, these dispersions are naturally viscous and the viscosity can be controlled by the rate of injection and the concentration of the resin in the solvent or dispersant. I have found that since the dispersion has a negative thixotropy, i. e., since its viscosity increases with the rate of shear, the dispersion may be injected into the well at a high rate to increase its viscosity and thus prevent the dispersion from entering the smaller pores in the rock. At high injection rate and high injection pressure, the dispersion may be used to fracture the formations along bedding planes and thus deposit the dispersion along a narrow lens about the well to prevent vertical migration of well fluids in the region of the well. The viscosity may also be increased by incorporating 5 to 10 per cent or more of the resin in the dispersant. The results in either case appear to be substantially equivalent.

After the polymethacrylate, dispersed as above described, has been injected into the porous rocks penetrated by the well, the coagulant is injected into the well in the same manner. That is, if the plugging agent was injected into the well throughout the complete section, the coagulant is also injected throughout the complete section. On the other hand, if the resinous solution is injected into a selected zone, as by the isolation of the zone with packers, the coagulant is injected generally throughout the same zone. It should be pointed out, however, that the two need not be injected into the identical strata. In salt water formations, a plug will be formed only where both the resin and the coagulant are injected. The coagulant may consist of any anionic compound miscible with the resin solution, such as the organic acids, cresol, phenol, etc. The organic acids melting below atmospheric temperatures are generally preferred, due to the greater convenience of introducing a liquid into a formation and mixing it with the resin solution. Therefore, the organic acids having less than about 18 carbon atoms to the molecule are generally satisfactory. I prefer, however, organic acids having less than about 10 carbon atoms to the molecule, since these acids appear to be stronger and, therefore, to effect coagulation of the polymer in the formation more readily. The coagulant, preferably diluted with a suitable solvent such as gasoline or kerosene, has been found to coagulate the polymethacrylates when the coagulant is present in the amount of about 0.5 per cent or more of the volume of the dispersed polymethacrylate. I prefer that substantially the same volume of coagulant be diluted and injected into the formation immediately following the resin. The coagulant may be diluted with from 10 to 100 or more volumes of a light hydrocarbon for best results.

In general, the lower organic acids, such as acetic acid, trichloroacetic acid, and the like, require a smaller concentration than the higher acids, such as naphthenic, palmitic, or myristic acids. A 4 per cent cresol (cresylic acid) or phenol (carbolic acid) solution, based on the volume of a 4 per cent isobutyl methacrylate-gasoline solution, has been found to produce a precipitate or coagulated solid which will plug the pores of most sandstone formations.

Obviously, this invention is not limited to the above-described sequence of operations. It will be apparent to those skilled in the art that the coagulant could first be dispersed in the pores of the rock by injecting it into the well ahead of the polymethacrylate solution and that the same or similar results would be obtained. In either case, when the resin and the coagulant have reacted, the resin is flocculated or precipitated in the pores of the rock. The solvent or dispersant is generally trapped in the pores with no deleterious effect. The flocculated polyacrylate has been found to vary in hardness, depending upon the type of polymer. In general, the polymers of acrylic esters are softer and more sticky than the polymers of methacrylate resins. The viscosity or hardness of the floc, which depends upon the type of polymer, is sufficient, in any case, to prevent flow of the floc through the interstices of the rocks and thus to plug these interstices and prevent flow of the connate fluids into the well through the pores.

While in the preferred embodiment polymethacrylate and a coagulant therefor are injected into a water-bearing strata to seal the pores of the strata and prevent migration of the fluids both vertically and horizontally in the formations, I have found that in many cases the resin may be injected without an extraneous coagulant to accomplish a very desirable result. Connate crude oils, particularly those containing anionic compounds, have been found to flocculate or precipitate the resin from the above-described dispersion. In some cases, therefore, the resin solution is injected into a water-bearing formation adjacent an oil-bearing formation; and, as the solution migrates to the crude-oil-water interface, the resin is precipitated in the rock pores. Thus, an impermeable boundary is produced between the oil and water which prevents the water from migrating into the oil formation and into the well. Other advantages of precipitating the resin with connate crude oil will occur to those skilled in this art.

Manifestly, the process, as described, is capable of other modification; and such modification as may be construed to fall within the scope and meaning of the appended claims is also considered to be within the spirit and intent of the invention.

I claim:

1. A method of sealing the pores in formations traversed by a well comprising injecting into said formations an acrylic resin dispersed in a solvent, said acrylic resin being present in the amount of at least 0.5 per cent of said solvent and injecting a liquid containing an anionic compound in a solution miscible with said solvent into said formation to flocculate said resin in said formation and seal said pores.

2. A method of sealing porous water-bearing formations traversed by a well comprising injecting into said formations a liquid hydrocarbon containing from 0.5 to 5 per cent by volume of a methacrylic resin in solution and injecting into said formation a coagulant for said resin to precipitate said resin in said formation.

3. A method of sealing porous water-bearing formations traversed by a well comprising injecting into said formations a liquid hydrocarbon containing from 0.5 to 5 per cent by volume of a methacrylic resin in solution and contacting said solution in said formation with an anionic reagent miscible with said hydrocarbon to precipitate said resin in said formation.

4. A method according to claim 3 in which said anionic reagent is a liquid organic acid.

5. A method according to claim 4 in which the volume of said organic acid is substantially equal to the volume of said resin.

6. A method according to claim 4 in which said organic acid is naphthenic acid.

7. A method of preventing vertical migration of fluid in a reservoir penetrated by a well comprising injecting into said well at least a 0.5 per cent dispersion of an acrylic resin in a solvent, said resin being injected at high rate and under a pressure sufficient to fracture the rocks along a horizontal plane of weakness, and then injecting into said well under pressure a coagulant for said resin to flocculate said resin in said rocks.

8. A method of sealing the pores in formations traversed by a well comprising injecting into said formations an acrylic resin dispersed in a solvent, said acrylic resins being present in the amount of at least 0.5 per cent of said solvent, and injecting a liquid anionic compound miscible with said solvent into said formation to flocculate said resin in said formation.

PAUL L. MENAUL.

References Cited in the file of this patent

UNITED STATES PATENTS

| Number | Name | Date |
| --- | --- | --- |
| 2,034,347 | Loomis et al. | Mar. 17, 1936 |
| 2,121,839 | Strain | June 28, 1938 |
| 2,348,484 | Lawton | May 9, 1944 |
| 2,378,817 | Wrightsman et al. | June 19, 1945 |
| 2,393,173 | Larsen | Jan. 15, 1946 |

OTHER REFERENCES

Torrey, P. D.: "Selective Exclusion of Fluids from Wells," The Oil Weekly, May 22, 1939, pages 26 to 35.

Strain, D. E. et al.: "Methacrylate Resins," Industrial and Engineering Chemistry, April 1939, page 383.